US 8,215,678 B2

(12) United States Patent
Peachey

(10) Patent No.: US 8,215,678 B2
(45) Date of Patent: Jul. 10, 2012

(54) CONNECTOR FOR A PIPE AND BONDING MEANS FOR USE THEREIN

(75) Inventor: Daniel Peachey, Bristol (GB)

(73) Assignee: Airbus Operations Limited, Bristol (GB)

( * ) Notice: Subject to any disclaimer, the term of this patent is extended or adjusted under 35 U.S.C. 154(b) by 29 days.

(21) Appl. No.: 12/507,832

(22) Filed: Jul. 23, 2009

(65) Prior Publication Data

US 2010/0045031 A1 Feb. 25, 2010

(30) Foreign Application Priority Data

Aug. 20, 2008 (GB) .................................. 0815203.5

(51) Int. Cl.
*F16L 39/04* (2006.01)
(52) U.S. Cl. .......................................... 285/302; 174/86
(58) Field of Classification Search .................. 285/302; 174/86
See application file for complete search history.

(56) References Cited

U.S. PATENT DOCUMENTS

| | | | | |
|---|---|---|---|---|
| 2,468,783 A | * | 5/1949 | Schwartz | |
| 2,900,436 A | * | 8/1959 | Appleton | 285/302 |
| 3,093,703 A | * | 6/1963 | Zavertnik | 285/321 |
| 3,154,632 A | * | 10/1964 | Browne | |
| 3,424,853 A | * | 1/1969 | Johnson | |
| 3,451,483 A | * | 6/1969 | Elliott et al. | 285/302 |
| 3,753,205 A | * | 8/1973 | Tuger | |
| 3,783,178 A | * | 1/1974 | Philibert et al. | 285/302 |
| 3,830,957 A | * | 8/1974 | Oberdiear | |
| 3,884,508 A | * | 5/1975 | Jones | 285/302 |
| 3,891,290 A | * | 6/1975 | Marshall | |
| 4,120,325 A | | 10/1978 | de Putter | |
| 4,250,350 A | * | 2/1981 | Polimine | 174/86 |
| 4,487,462 A | * | 12/1984 | Gale et al. | |
| 4,558,173 A | * | 12/1985 | Gajajiva et al. | 285/302 |
| 4,808,117 A | | 2/1989 | Gale et al. | |
| 4,928,202 A | * | 5/1990 | Gale et al. | |
| 5,466,890 A | * | 11/1995 | Stagnitti | 174/84 R |
| 5,792,990 A | * | 8/1998 | Piero | |
| 6,734,360 B2 | * | 5/2004 | Magno | |
| 6,883,836 B2 | | 4/2005 | Breay et al. | |

FOREIGN PATENT DOCUMENTS

CA 1002085 12/1976

OTHER PUBLICATIONS

UK Search Report for GB0815203.5 dated Dec. 10, 2008.

* cited by examiner

*Primary Examiner* — David E Bochna
(74) *Attorney, Agent, or Firm* — Lowe, Hauptman, Ham & Berner, LLP

(57) ABSTRACT

A pipe connector having two connector elements each arranged for interconnection and connection to a respective pipe, a retaining member for maintaining interconnection of the connector elements and a ring member arranged for capture by the retaining member and biased into contact with both connector elements of the pipe connector, the ring member being formed as a single piece of electrically conductive material so as to provide electrical bonding directly between the two connector elements of the pipe connector.

8 Claims, 4 Drawing Sheets

CONNECTOR FOR A PIPE AND BONDING MEANS FOR USE THEREIN

RELATED APPLICATIONS

The present application is based on, and claims priority from, British Application Number 0815203.5, filed Aug. 20, 2008, the disclosure of which is hereby incorporated by reference herein in its entirety.

FIELD OF INVENTION

The present invention relates to a connector for a pipe and bonding means for use therein.

BACKGROUND OF THE INVENTION

Pipe for many applications are manufactured in lengths and then joined together using pipe connectors to provide the required length of pipe run. In many applications, such as fuel, venting or inerting systems, where flammable fluids or vapours are transported by a pipe run, any electrical arcing within or around the pipe run is potentially hazardous and thus must be minimised. One mechanism employed for reducing such arcing is bonding or cross-bonding which provides a conductive path across pipe connectors to minimise the risk of arcing. For example, a bonding strap may be fixed across the pipe connector parts after the parts have been coupled.

One problem with such mechanisms for cross-bonding pipe connectors are that the bonding strap is easily damaged when in use or during maintenance procedures and may also be susceptible to corrosion. Furthermore, maintenance procedures, which require the decoupling of the pipe connector, are further complicated by the requirement to detach and reattach the bonding strap.

SUMMARY OF THE INVENTION

An embodiment of the invention provides a connector for a pipe, the connector comprising:
a first connector element comprising a hollow generally cylindrical body member providing a connection for a pipe at one end and first coupling means at the other end;
a second connector element comprising a hollow generally cylindrical body member providing a connection for a pipe at one end and second coupling means at the other end arranged for coupling with the first coupling means;
retaining means arranged to maintain the coupling of the first and second coupling means; and
a single bonding ring formed as a single piece and retained within the retaining means, the bonding ring being biased into direct contact with the first and second connector elements so as to provide electrical bonding directly between the first and second connector elements and, in combination with the retaining means, to maintain the coupling of the first and second coupling means.

The bonding means may be biased into contact with the first and second connector elements so as to maintain contact with the first and second connector elements for at least a predetermined range of relative movement between the first and second connector elements. The bonding means may be self-biased into the contact with the first and second connector elements. The bonding means may be biased into contact with the first and second connector elements by the retaining means.

The bonding means may be further arranged to provide a seal for sealing the coupling of the first and second coupling means. The bonding means may be at least partially formed from metal. The bonding means may be at least partially formed from an electrically conductive polymer. The bonding means may be at least partially formed from a composite material. The first and second coupling means may be provided by respective male and female formations and the retaining means is arranged to maintain the male formation within the female formation and the bonding means biased into contact with the first and second connector elements. The connector may be arranged for use in a fuel system. The connector may be arranged for use in aircraft.

Another embodiment of the invention provides bonding means for use in a pipe connector, the pipe connector comprising two connector elements each arranged for interconnection and for connection to a respective pipe, and retaining means for maintaining the interconnection of the connector elements, the bonding means comprising:
a ring member arranged for capture by a retaining means of a pipe connector and biased into contact with both connector elements of the pipe connector, the ring member being formed as a single piece of electrically conductive material so as to provide electrical bonding directly between the two connector elements of the pipe connector.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
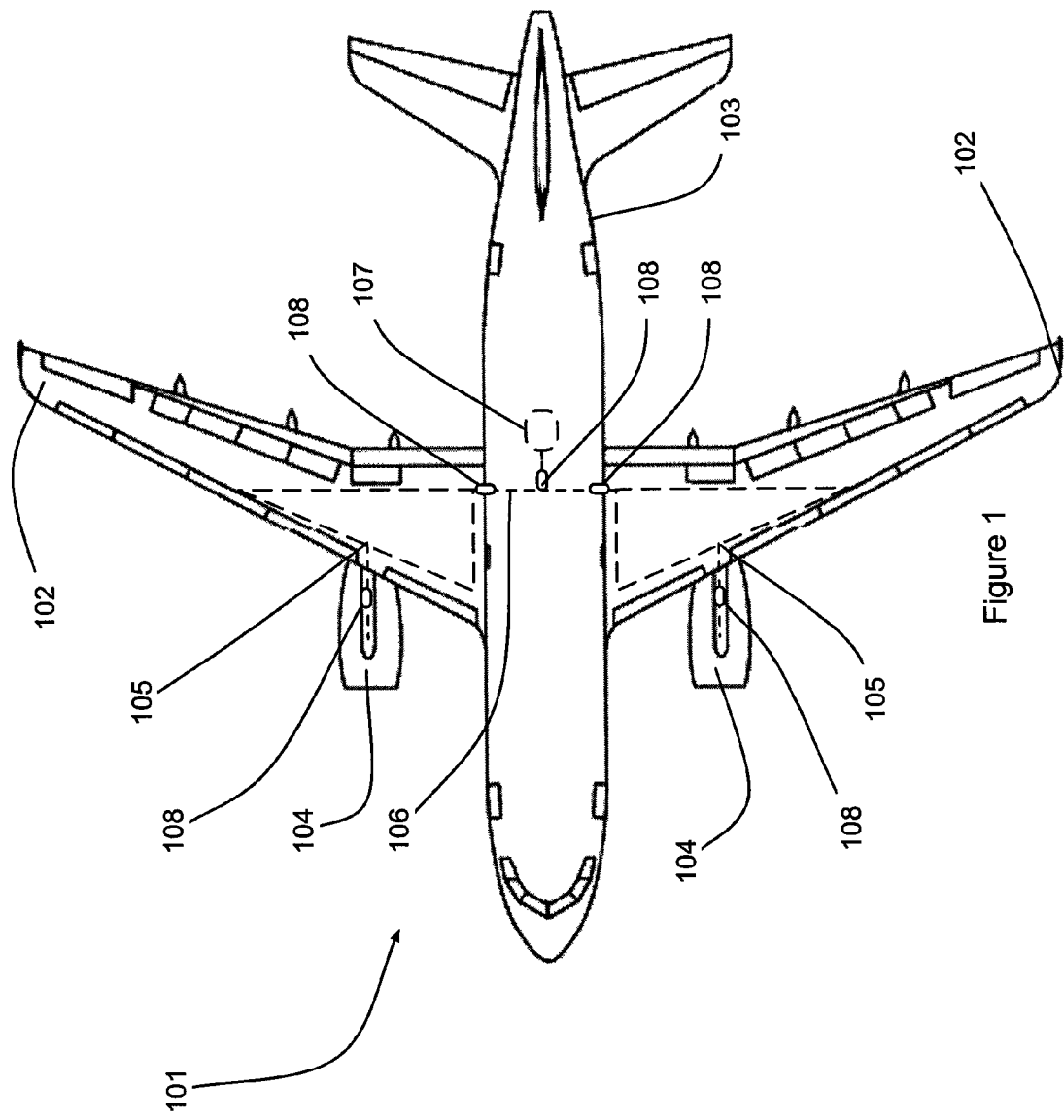
FIG. 1 is a schematic illustration of an aircraft comprising a fuel system.

With reference to FIG. 1, an aircraft 101 comprises a pair of wings 102 faired into a fuselage 103. Each wing 102 carries an engine 104 and an internally located fuel tank 105. The fuel tanks 105 are connected to the engines 104 by a set of fuel lines or pipes 106. The supply of fuel from the fuel tanks 105 to the engines 104 is controlled by a fuel management system 107. The fuel pipes 106 are constructed from a series of lengths of pipes jointed using pipe connectors 108. As will be understood by those skilled in the art, an aircraft may comprise a large number of pipe connectors 108. For clarity, only five pipe connectors are shown in FIG. 1.

Figure 2:
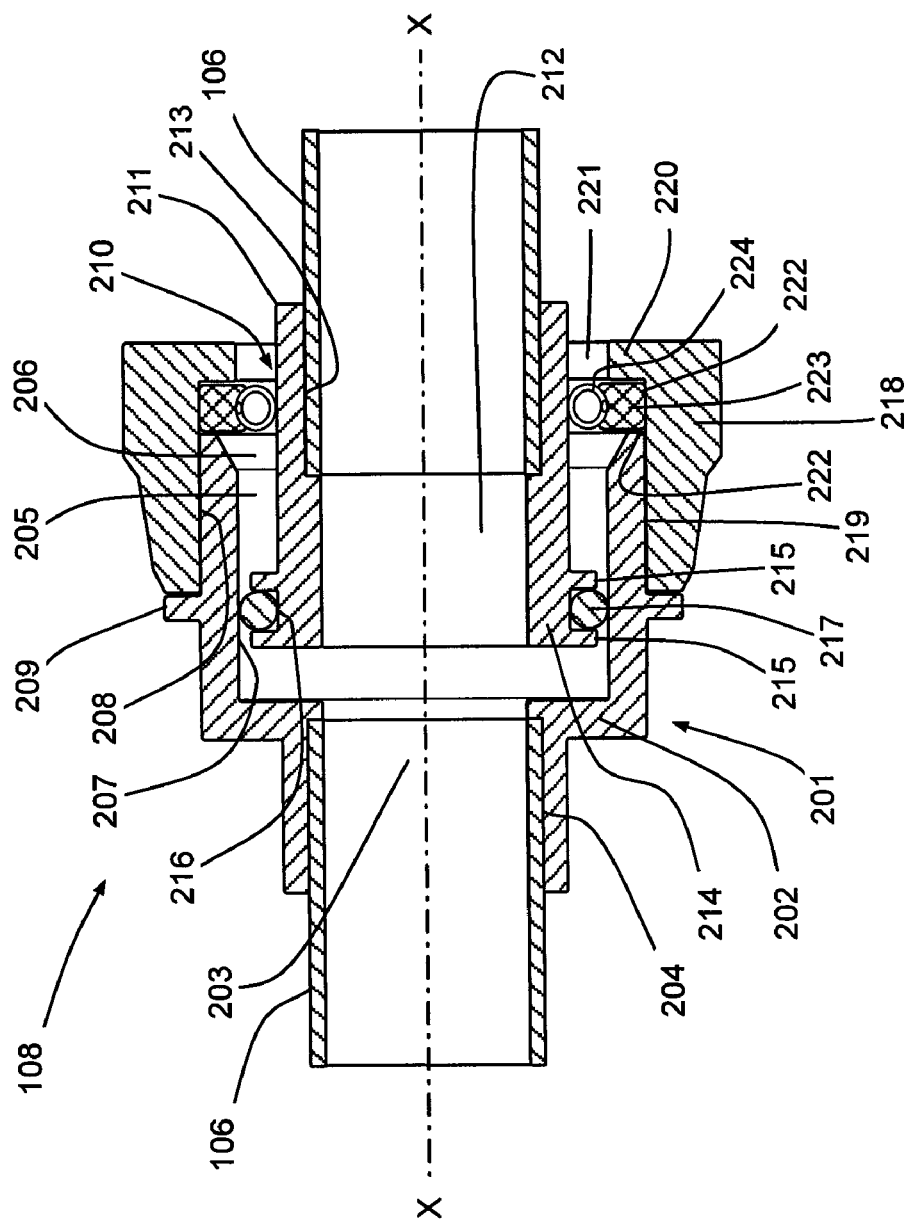
FIG. 2 is cross sectional side view of a pipe connector in the fuel system of FIG. 1.

With reference to FIG. 2, one of the pipe connectors 108 comprises a female pipe connector element 201 comprising an annular body member 202 having a central axis X and providing an internal space 203 for fuel flow. The body member 202 comprises pipe connection means 204, in the form of a first cylindrical socket, formed at one end, for connecting to a pipe 106. The body member 202 further comprises a second cylindrical socket 205 formed at the end opposite to the first socket 204. The second socket 205 has an internally linearly tapered opening 206 that is tapered inwardly towards the central axis X. The internal surface of the socket 205 provides a cylindrical seat 207. The outer surface of the second cylindrical socket 205 comprises a threaded region 208 and further comprises a radial flange 209. The threaded region 208 is located axially between the opening of the second socket 205 and the flange 209. The functions of the threaded region 208 and flange 209 will be described in further detail below.

The pipe connector 108 further comprises a male pipe connector element 210 comprising an annular body member 211 having a central axis X and providing an internal space 212 for fuel flow. The body member 211 further comprises pipe connection means 213, in the form of a cylindrical socket, formed at one end, for connecting to a pipe 106. The body member 211 further comprises a cylindrical spigot 214 formed at the end opposite to the socket 213. The spigot 214 further comprises two radial flanges 215 on its outer surface which together form a cylindrical seal seat 216 at the distal end of the spigot 214. An o-ring seal 217 is retained within the seal seat 216. The seal 217 is arranged to provide a fluid-tight seal between cylindrical seat 207 of the second socket 205 of the female pipe connector element 201 and the spigot 214 thus enabling the pipe connector 108 to provide a fuel-tight joint for the pipes 106.

The pipe connector 108 further comprises retaining means 218 in the form of a nut. The nut 218 is substantially annular and comprises a threaded portion 219 at one end of its internal surface for threaded engagement with the threaded portion 208 of the female pipe connector element 201. The nut 218 further comprises a flange 220 formed at its other end on its internal surface and arranged to provide a constricted opening 221. In the present embodiment, the constricted opening 221 is arranged to be sufficiently large so as to enable the spigot 214 to pass through the nut 218. The internal radial face of the flange 220, the adjoining part of the internal surface of the nut 218 and the end face 222 of the cylindrical socket 205 are arranged, in their fully engaged combination, to provide a seat for a bonding means 223. When the nut 218 is fully engaged with the female pipe connector element 201, the bonding means 223 is clamped between the internal radial face of the flange 220 and the end face 222. The bonding means 223 is substantially ring shaped and arranged to effectively reduce the constricted opening 221 so as to retain the spigot 214 within the nut 218 and thus retain the male pipe connector element 210 engaged within the female pipe connector element 201 as shown in FIG. 2. In the present embodiment, the bonding means 223 is further arranged to provide electrical cross bonding between the male and female pipe connector elements 201, 210 and respective pipes 106.

Figure 3:
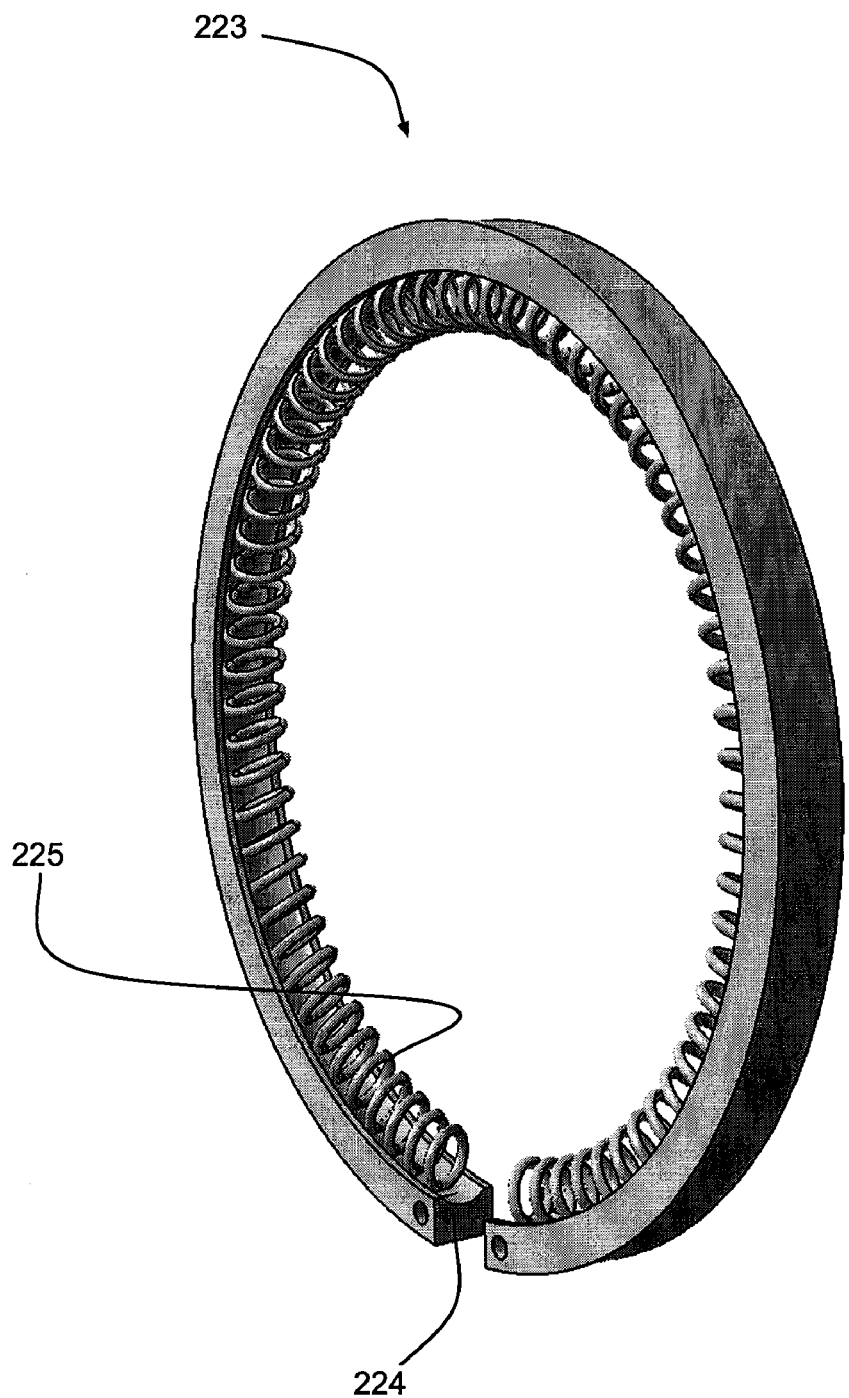
FIG. 3 is a perspective view of bonding means for the pipe connector of FIG. 2.

In the present embodiment, with reference to FIG. 3, the bonding means 223 comprises a ring shaped bearing member 224 having a substantially rhomboid cross section. The bonding means 223 further comprises a biasing member 225 in the form of a generally helical spring fixed around the internal surface of the bearing member 224. The bearing member 224 is arranged to be maintained in electrical contact with the end face 222 of the female pipe connector element 201 by the nut 218. The biasing member 225 is internally biased into electrical contact with the exterior surface of the body member 211 of the male pipe connector element 210. Since both the bearing member 224 and the biasing member 225 are formed from electrically conductive material, the bonding means 223 is thus arranged to provide electrical bonding between the male and female pipe connector elements 201, 210 and respective pipes 106. In the present embodiment, the bonding means 223 is formed from corrosion resistant steel in the form of stainless steel.

Figure 4A:
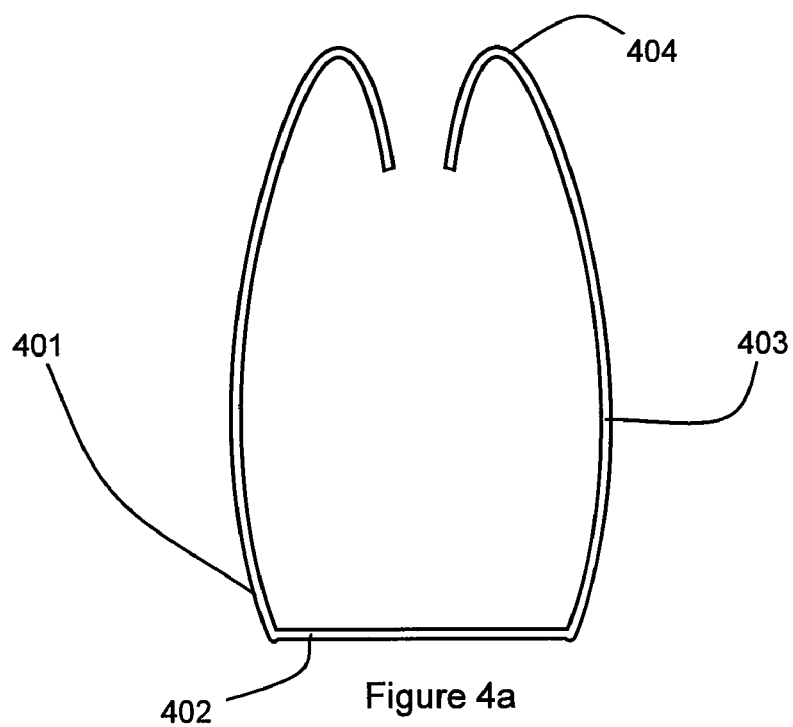
FIGS. 4a & 4b are cross sectional views of bonding means in accordance with further embodiments of the invention.

With reference to FIG. 4a, in another embodiment, the bonding means 401 is a ring shaped structure having and integral bearing member and biasing member formed from a resilient metal. The bonding means 401 is provided for use in place of the bonding ring 224 in the pipe connector of FIG. 2. The bonding means 401 is substantially u-shaped in cross section with a flat base element 402 and the radially inwardly extending side arms of the "U" being folded inwardly back at their ends thus providing sprung side arms 403 biased to maintain bearing surfaces 404 in contact with a male pipe connector element. In the present embodiment, each of the sprung side arms 403 are also radially castellated so as to provide a plurality of radially disposed sprung arms 403.

Figure 4B:
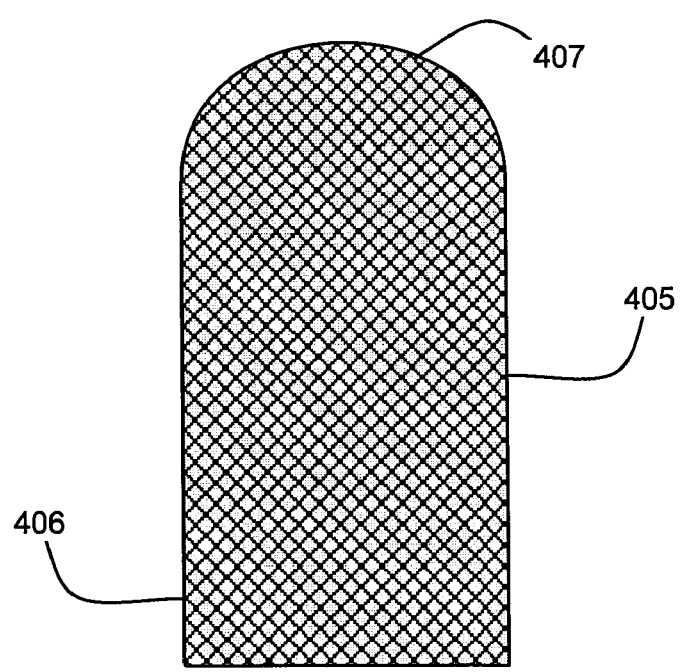

With reference to FIG. 4b, in a further embodiment, the bonding means 405 is a ring shaped structure formed from a resilient electrically conductive polymer having a base part 406 arranged to conform with a corresponding seat within a retaining nut and a domed contact part 407 for maintaining contact with a male pipe connector element. The bonding means 405 is provided for use in place of the bonding ring 224 in the pipe connector of FIG. 2.

In another embodiment, the flange 220 of the nut 218 is extended inwardly so as to further reduce the constricted opening 221 to retain the spigot 214 within the nut 218 and thus retain the male pipe connector element 210 engaged within the female pipe connector element 201 as shown in FIG. 2. Thus, the extended flange 220, replaces the retaining function of the bonding means. The bonding means therefore provides solely an electrical cross bonding function.

In a further embodiment, the bonding means is further arranged to provide a fluid seal between the male and female pipe connector elements. The bonding means may provide this fluid seal as an additional seal or as the sole seal for the pipe connector. The bonding means may provide the fluid seal and electrical cross bonding in addition to, or instead of, its retaining function as described above.

As will be understood by those skilled in the art, the bonding means may be constructed in any suitable manner, for example, as described above, the bonding means may be one piece or constructed from two or more pieces, which may be fixed together or held together in use. In a two-piece arrangement where the bonding means comprises a bearing element and a biasing element, the bonding means may be carried by the male pipe connector element. In other words, the bearing element may be arranged to abut the male pipe connector element and the biasing element arranged to be biased outwardly to contact the female pipe connector element. Similarly, given a one-piece construction, the biasing action may be arranged to act outwardly. In another embodiment, the bonding means is arranged so as to be non-biased internally but biased into contact with the male and female pipe connector elements by the retaining means.

As will be understood by those skilled in the art, the bonding means may be constructed as a single spring helix, coil, mesh, strip, braid or wire or may comprise a series of circumferentially interlinked elements. The bonding means may be constructed from any suitable electrically conductive material such as aluminium, titanium, corrosion resistant steel or one or more conductive polymers. The selection of the materials for the bonding means may be dependent on the material used for the pipe connector elements or vice versa.

As will be understood by those skilled in the art, the pipe connector elements may be formed from any suitable material such as aluminium, titanium, corrosion resistant steel or composite materials. The pipe connector elements may be formed by any suitable method such as moulding, machining, casting, depending on the materials used. Furthermore, the pipes may be connected to the respective pipe connector elements by any suitable method such as brazing, swaging, welding or bonding, depending on the materials used.

As will be understood by those skilled in the art, pipe connectors comprising the bonding means as described above may be used in any suitable application such as fuel systems carrying fuel in gas, liquid or vapour states, inerting systems, venting systems for gas or vapour and any associated systems.

As will be understood by those skilled in the art, the resilience in the bonding means needs to be sufficient to maintain electrical contact between the male and female pipe connector element. For example, in an aircraft fuel system, flexure between male and female pipe connector elements may be in the range of ±2 degrees. In some systems the range may be extended to ±4 degrees. As will be understood by those skilled in the art, embodiments of the invention may be provided for use with any suitable pipe diameter. For example, typically in an aircraft fuel system pipe diameters are about 25 to 100 mm. In other systems pipe connectors for larger or smaller pipe diameters may be provided.

Thus, embodiments of the invention provide a reduction in the typical parts count for a pipe connector since no bonding leads are required because the bonding function is integrated into an existing coupling. The retaining ring with the bonding function may be provided as a direct replacement part for an existing non-bonding retaining ring. Furthermore, the biasing of the bonding means ensures that the electrical contact maintained required for bonding is maintained during relative angular and radial movement of the male and female pipe connector elements.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A connector for a pipe, said connector comprising:
   a first connector element comprising a hollow generally cylindrical body member providing a connection for a pipe at one end and a first coupling portion at the other end;
   a second connector element comprising a hollow generally cylindrical body member providing a connection for a pipe at one end and a second coupling portion at an opposing end arranged for coupling with said first coupling portion, said first and second coupling portions being further arranged for relative axial sliding and angular flexure when coupled together;
   a bonding ring and an integral biasing element formed together as a single piece, said biasing element being arranged to radially bias said bonding ring into contact with said second connector element so as to maintain electrical bonding between said first and second connector elements during said relative axial sliding and angular flexure and to retain said second coupling portion within said first coupling portion; and
   a retaining member coupled to said first coupling portion and arranged to retain said bonding ring mounted on said second coupling portion.

2. A connector according to claim 1 in which said bonding ring is further arranged to provide a seal for sealing said coupling of said first and second coupling portions.

3. A connector according to claim 1 in which said bonding ring is at least partially formed from metal.

4. A connector according to claim 1 in which said bonding ring is at least partially formed from an electrically conductive polymer.

5. A connector according to claim 1 in which said bonding ring is at least partially formed from a composite material.

6. A connector according to claim 1 arranged for use in a fuel system.

7. A connector according to claim 1 arranged for use in aircraft.

8. A bonding element according to claim 1, wherein said bonding ring is a split ring.

\* \* \* \* \*